United States Patent [19]

Mungia et al.

[11] Patent Number: 5,046,354
[45] Date of Patent: Sep. 10, 1991

[54] PRESSURIZED STORAGE TANK WITH AUTOMATIC SHUT-DOWN IN CASE OF LEAKAGE

[76] Inventors: Robert R. Mungia, 929 N. Pierre Rd., Walnut, Calif. 91789; Charles L. Papish, 2426 Valewood, San Dimas, Calif. 91773

[21] Appl. No.: 414,856

[22] Filed: Sep. 29, 1989

[51] Int. Cl.[5] ............................................. G01M 3/04
[52] U.S. Cl. ...................................... 73/49.2; 137/459
[58] Field of Search ...................... 73/49.2, 40.5 R, 40; 137/459, 495, 486, 487.5, 624.12; 220/1 B, 5 A

[56] References Cited

U.S. PATENT DOCUMENTS

| | | | |
|---|---|---|---|
| 1,896,673 | 2/1933 | Kopsa et al. | 62/206 |
| 2,501,709 | 3/1950 | Booth | 165/38 |
| 3,628,562 | 12/1971 | Bruins | 137/459 |
| 3,754,563 | 8/1973 | Boals | 137/94 |
| 4,494,666 | 1/1985 | Cooper et al. | 220/3 |
| 4,715,513 | 12/1987 | Shelton, Jr. | 73/49.2 X |
| 4,735,231 | 4/1988 | Jacquet | 137/459 |

FOREIGN PATENT DOCUMENTS 1475782 12/1969 Fed. Rep. of Germany ....... 73/49.2

OTHER PUBLICATIONS

The Handbook of Chlorination, by George Clifford White (1988), pp. 626–627.

*Primary Examiner*—Hezron E. Williams
*Assistant Examiner*—Joseph W. Roskos
*Attorney, Agent, or Firm*—Pretty, Schroeder, Brueggemann & Clark

[57] ABSTRACT

A pressurized storage tank for toxic chemicals includes a shut-down valve assembly. Upon detection of a leak, the shut-down valve assembly stops the flow of chemicals from the outlet valves of the tank. The shut-down valve assembly is located within the pressure vessel of the tank for maximum safety. The outlet valves of the tank are external to the pressure vessel and are connected to the valve assembly. The shut-down valve assembly operates in a fail-safe manner, such that removal of power or control signals to the valve assembly results in the valves being closed.

10 Claims, 3 Drawing Sheets

PRESSURIZED STORAGE TANK WITH AUTOMATIC SHUT-DOWN IN CASE OF LEAKAGE

BACKGROUND OF THE INVENTION

1. Field of the Invention

This invention relates to apparatus for the storage of fluids, and more particularly to pressurized storage tank systems with automatic shut-down of fluid flow upon the detection of a leak in the system.

2. Description of the Related Art

Bulk storage tanks are often used to store toxic chemicals, such as chlorine and sulfur dioxide. When a manufacturing plant or water treatment facility requires a ready supply of chlorine, for example, a bulk storage tank may be installed at a convenient location. Supply lines are used to connect the bulk storage tank with the facility. The storage tank may, for example, have a capacity of from 150 pounds to 90 tons of chlorine. A pressurized storage tank typically comprises a large cylindrical pressure vessel positioned longitudinally on its side. On the top surface of the tank, the pressure vessel extends upward in a cylindrical extension called the tank neck. Outlet angle valves extend upwardly from the neck and are used to regulate the flow of contents from the tank. A hand wheel is used to continuously adjust the flow by turning the outlet angle valve stem. The outlet valves end in a pipe fitting extending at an angle of 90° from vertical for connection to the supply lines that carry the chlorine gas and liquid to the facility. A cylinder with a hinged lid may be attached to the neck, covering the outlet valves. Such a cylinder is referred to as a manway.

Pressurized storage tanks themselves rarely leak. Rather, the outlet valves, associated fittings, or supply lines may fail or become damaged and leak. Leaks are dangerous because, as noted, pressurized storage tanks are frequently used for storing toxic chemicals that can cause severe health and safety problems and damage the environment. Chlorine gas is extremely dangerous because it displaces air, and anyone breathing it can be quickly overcome by the gas and will suffocate. Recently enacted government and industry standards call for stationary pressurized storage tanks to be housed in a building structure that includes a "scrubber" and a leak detector. The scrubber is for neutralizing any chlorine gas that escapes from the tank, its valves, or fittings located within the structure. The leak detector is for detecting the presence of the chlorine outside of the tank but within the structure. The scrubber housed in the structure contains a substance known as a "caustic" that mixes with chlorine gas to transform it into, essentially, liquid chlorine bleach. When a leak is detected, the scrubber is energized, reacting the chlorine gas with the caustic, resulting in a relatively safe liquid bleach. The bleach can then be safely removed. The scrubber thereby removes the dangerous gas from within the structure, and then repairs on the leak may proceed.

A leak may occur at any time of day and may go undetected for some time, depending on the location of the tank, the maintenance schedule, and the rate of use. Therefore, the scrubber systems must contain sufficient caustic to be capable of neutralizing the entire contents of a conventional storage tank. Depending on how quickly the contents must be neutralized, and depending on the flow pressures involved, a 90 ton capacity pressurized storage tank may require a scrubber system with more than 90 tons (18,000 gallons) of caustic. As noted, tanks themselves rarely leak. Typically, the valves or supply lines fail. If one could be certain of discovering and shutting down the flow of the chlorine before all 90 tons escaped from the tank, it would not be necessary to provide for neutralizing the entire contents of a pressurized storage tank. Furthermore, there would be much less damage to the environment if one could be certain of stopping a leak shortly after it occurs. There would be much less danger to maintenance crews in coming upon the scene of a leak. Any leaks that did occur would be far safer and easier to clean up. Finally, the scrubber systems involved could be constructed with much lower caustic capacity and therefore at much less cost.

One automatic tank shut-down system for railroad tank cars has been developed by The Clorox Company, and is discussed in The Handbook of Chlorination (1988), by George Clifford White, at pages 626-627. This shut-down system makes use of a motor operated valve actuator. The actuator fits over the tank car outlet valve and comprises a D.C. motor designed to exert a 50 foot-pounds torque on the outlet valve stem. The actuator torque has a self-limiter, which prevents the actuator from shearing off the valve stem or otherwise damaging the valve. Thus, the shut-down system stops the flow of tank contents by turning the hand wheel of the valve. After a shut-down, the tank car outlet valve must be opened manually by turning the hand wheel. A self-contained D.C. power source protects against a disruption in operation due to power failure. When a leak is detected, the D.C. motor must be activated to apply the necessary torque to the valve stem and shut down the fluid flow.

Although the Clorox tank car shut-down system is suitable for its intended application, circumstances may arise under which the system is not ideal. For example, the shut-down system actually operates on the outlet valve of the tank. As noted, pressurized storage tanks themselves rarely leak, but their valves or associated fittings may fail. The Clorox automatic shut-down system will have no effect on a leak if the source of the leak is the tank outlet valve. Furthermore, no shut-down will occur if there is damage to the D.C. motor or if parts of the motor become worn out. If any such damage occurs, the tank valve may likely be in the open state, and will have to be closed manually. Thus, the risk of leakage is not greatly reduced. Even if the shut-down system operates as intended, and the valve is not the source of the leak, the valve must still be manually opened once repairs have been completed. Finally, because the actuator fits over the tank car outlet valve, the shut-down system is vulnerable to exterior damage, including corrosion, vandalism, and tank car derailment.

Thus, there is a need for a pressurized storage tank with automatic shut-down of the tank flow upon detection of a leak. The shut-down should occur quickly after leak detection, for minimizing the required capacity of scrubber systems. The shut-down system should not be vulnerable to external damage or to power or control failure. Finally, the system should be capable of convenient resumption of flow after shut-down.

SUMMARY OF THE INVENTION

In accordance with the present invention, a novel pressure vessel storage tank is provided with a valve assembly that is lowered into the pressure vessel and is then connected to the tank outlet valves. The valve assembly includes shut-down valves that are energized to remain fully open and that communicate with the tank's outlet valves. That is, the shut-down valves are located in the tank, upstream of the outlet valves. Thus, the outward appearance of the novel tank is unchanged from that of a conventional tank. A leak detector external to the tank senses any leakage, in response to which the shut-down valves are closed. Control signals and operating power are provided to the valve assembly by control circuitry and a power supply.

The shut-down valves are constructed to operate in a fail-safe manner. That is, if power or control signals to the shut-down valves are removed, the valves will quickly close. Thus, in the event of a power failure or other accident that removes power to the valves, there will be no chance of leaks because the valves will automatically shut down the tank flow to the outlet valves. Preferably, the shut-down valves are air operated, the valve stem working against the force of a spring. This allows the valves to be of a smaller size and to be faster acting than otherwise. Because the shut-down valves are located within the body of the tank, in the pressure vessel, even if the tank's outlet valves were completely sheared off, the subsequent leak would be quickly detected and the tank flow to the outlet valves would still be automatically shut down before much of the contents spilled out. The shut-down valves may alternatively be electrically or hydraulically operated.

Thus, in a tank constructed in accordance with the present invention, the shut-down valves are located within the tank and are closed upon detection of a leak; all flow out of the tank is stopped. A scrubber may then be activated to neutralize whatever small amount of toxic chemical, for example chlorine, has already escaped. Because the valve assembly quickly shuts down any flow out of the pressure vessel, it is not necessary to provide for neutralizing the entire contents of the storage tank. There is no practical way for the entire contents of the tank to leak out. Thus, a much smaller capacity scrubber may be used with the novel tank constructed in accordance with the present invention. Other features and advantages of the present invention will be appreciated from the following description of the preferred embodiment, taken in conjunction with the accompanying drawings, which illustrate by way of example the principles of the invention. Like reference numerals refer to like elements in the several drawings.

DESCRIPTION OF THE PREFERRED EMBODIMENT

The following description of the preferred embodiment of the present invention is not to be taken in a limiting sense, but is made merely for the purpose of illustrating the general principles of the invention. The scope of the invention is best defined by the appended claims. The following detailed description is of the best presently contemplated mode of carrying out the invention.

Figure 1:
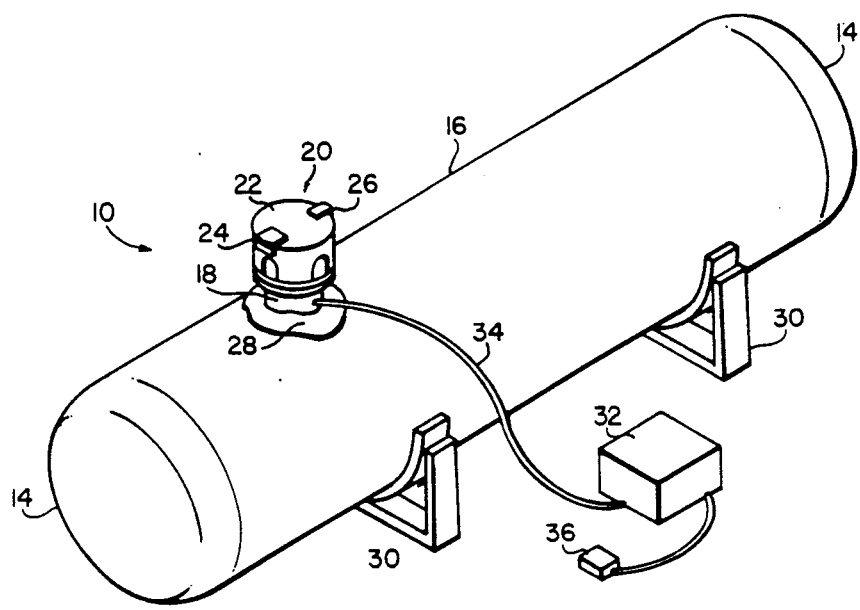
FIG. 1 is a perspective view of a bulk storage tank constructed in accordance with the present invention.

FIG. 1 shows a pressurized storage tank 10 constructed in accordance with the present invention. The tank has a capacity of 18,000 gallons, or 90 tons of chlorine. The generally cylindrical portion of the tank is formed from three-fourths inch thick steel 12 formed into a generally cylindrical shape. The tank is laid lengthwise, with two endcaps 14 and a curved upper surface, or dome 16, that faces upward. The tank has an overall length of greater than 50 feet, and has an outside diameter of 96 inches. The tank dome includes a generally cylindrical extension referred to as a neck 18. The neck extends generally straight up and is constructed of three-eighths inch thick steel. The neck is welded to the dome of the tank and is sealed by a top plate 46. The tank cylinder, neck, and top plate comprise a pressure vessel. Outlet valves tap into the tank contents through the top plate.

Attached to the top of the neck 18 is a cylindrical extension referred to as a manway 20. The manway encloses the tank's outlet valves, and is provided with a circular lid 22 secured by a hinge 24 and a hasp 26. The manway is provided with access slots 21 that provide limited access to the outlet valves to allow manual adjustment of outlet valve flow. A reinforcing flange 28 is welded to the tank dome 16 in an area extending around the neck. The flange consists of five-eighths inch thick steel with an outside diameter of 29 inches located on the tank dome at the joint of the neck and the dome. The flange may also function as a working platform.

The tank 10 is supported in place by support legs 30 at each end of the tank. The support legs raise the tank above ground level by five to eight inches for better maintenance and inspection, and to minimize corrosion. A system control box 32 is mounted near the tank and includes the power source and processing circuitry necessary for proper operation of the tank systems. The control signals and power are delivered to the tank via a cable 34 extending from the system control box to the tank. One or more leak detectors 36 are placed in the vicinity of the tank in order to monitor leaks in the area of interest. The tank may be housed in a building structure (not illustrated) equipped with a scrubber system (not illustrated) for neutralizing spills.

Figure 3:
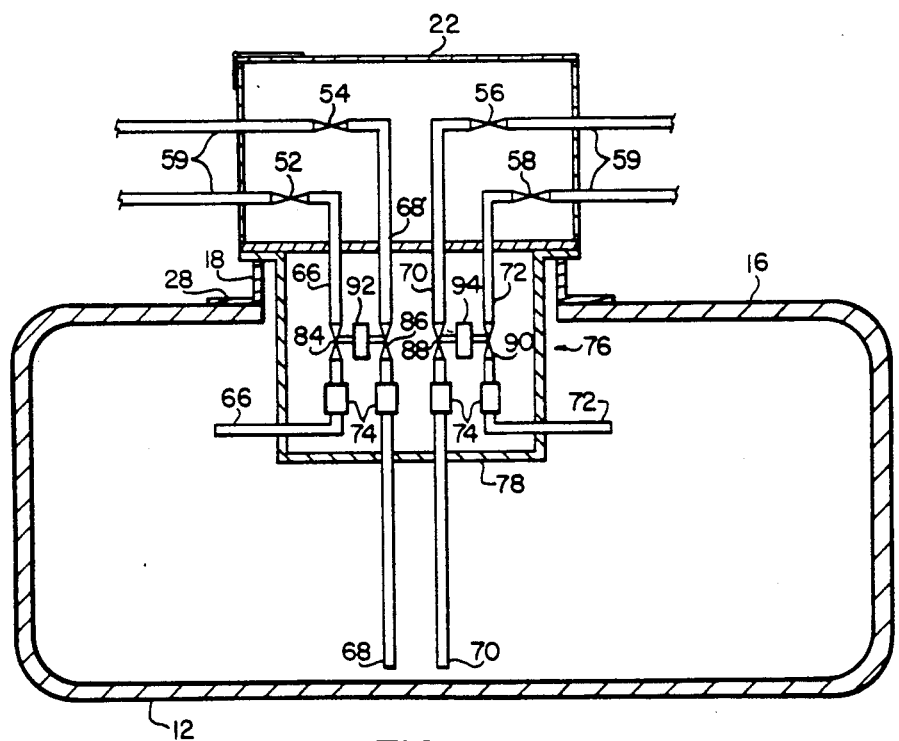
FIG. 3 is a block diagram representing in schematic form the functional components of the bulk storage tank of FIG. 1.
Figure 2:
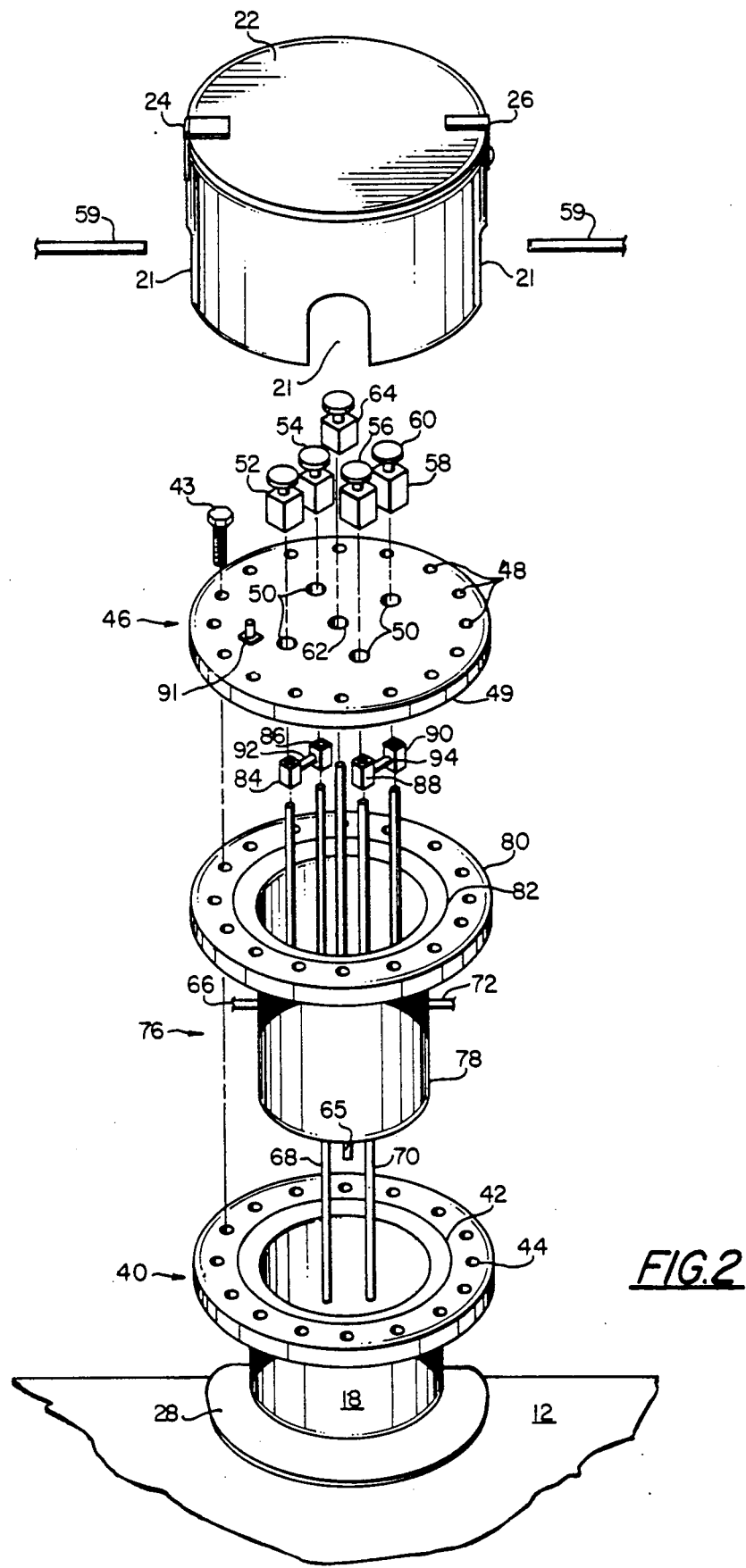
FIG. 2 is an exploded perspective view of the manway details of the bulk storage tank of FIG. 1.

FIG. 2 is an exploded perspective view of the pressurized storage tank of FIG. 1, while FIG. 3 is a schematic representation illustrating the operating principles of the tank. As noted, the pressure vessel of the tank includes the tank proper 12, the neck 18, and the top plate 46. The upper edge of the neck is surrounded by a collar 40 forming a flange with a flat top surface. The collar is welded to the neck at the neck's top edge. An approximately one-inch wide 3/16 inch deep groove 42 is cut into the top surface of the collar. A plurality of bolt holes 44 are placed in the collar equally spaced about the outside circumference of the groove. As noted, the top plate is attached to the neck, thereby sealing the tank and creating a pressure vessel. The outside diameter of the collar is equal to that of the top plate. The top plate is provided with a plurality of bolt holes 48 that align with the bolt holes in the collar. The bolt holes are of one and one-eighth inch diameter to accommodate standard pipe fittings. A fastening bolt 43 is passed through each one of the aligned holes 44 and 48, and secured with a nut (not illustrated). The underside of the top plate includes an approximately one inch wide ridge 49 extending downwardly approximately ¼ inch.

The top plate 46 is also provided with four threaded valve holes 50 located about the center of the top plate. One of four outlet angle valves 52, 54, 56, and 58 is screwed into each one of the valve holes 50. These valves provide flow communication from the contents of the tank to flow lines 59 that carry the tank contents away from the tank 10 to where they are needed. The outlet valves are standard, commercially available one and one-fourth inch valves that have, for example, a nominal inside diameter of one inch. Each of the outlet valves includes a manually operable hand wheel 60 to continuously control flow through the valve to the flow lines. A central valve hole 62 is provided in the top plate 46, to which a pressure relief valve 64 is attached. A pipe 65 is attached to the pressure relief valve and communicates with the tank pressure vessel for monitoring tank pressure. These elements are illustrated in FIG. 2 but are omitted from FIG. 3 for clarity. The pressure relief valve opens on-e the pressure inside the tank exceeds a predetermined value and prevents tank rupture due to excessive internal pressure.

Within the tank, four supply lines 66, 68, 70, and 72 connect the four outlet valves 52, 54, 56, and 58, respectively, to various locations within the tank. It is to be understood that FIG. 3 is a schematic representation of the tank shut-down system and is not an exact physical representation of the preferred embodiment. Thus, the outlet valves in FIG. 3 are not shown at the top plate 46 for drawing clarity. The supply lines 66–72 are pipes having a one inch inside diameter. Because of the physical properties of chlorine, at least 20% of the tank's internal volume will always be comprised of chlorine gas, while the remaining volume will be chlorine in a liquid state. Thus, two of the supply lines 68, 70 extend to the bottom portion of the tank's internal volume to tap the pool of liquid chlorine. These supply lines generally drop to within 1 to 2 inches of the tank bottom. The other two supply lines 66, 72 extend to locations within the tank such that their ends are in the upper 20% of the tank volume to tap chlorine gas. Thus, two of the supply lines 66, 72 and their associated outlet valves 52, 58 are used for supplying chlorine gas, while the other two supply lines 68, 70 and their associated outlet valves 54, 56 are used for supplying liquid chlorine to the flow lines 59.

Each one of the supply lines includes a flow check valve 74 that stops shut if the flow of gas or liquid through the check valve exceeds a predetermined value. The value is selected to be a particular flow rate that would indicate that the associated flow line 59 has ruptured, there is a flow greater than the system supplied by the tank can safely handle, or other malfunction in the delivery system has occurred. The check valve may be located at any point in the supply lines 66–72 upstream of each respective outlet valve, either inside or outside of a shut-down valve bucket 78 described below.

A shut-down valve assembly 76 is located within the pressure vessel of the tank between the supply lines 66–72 and the outlet valves 52–58. The valve assembly includes a shut-down valve bucket 78 with a mounting flange 80 having an approximately one-inch wide, 3/16 inch deep groove 82 in its top surface and an approximately one-inch wide raised ridge 83 extending approximately ¼ inch from its underside. A plurality of bolt holes 81 are placed in the mounting flange of the valve bucket, equally spaced about the circumference of the groove 82. The bolt holes align with the collar bolt holes 44 and the top plate bolt holes 48, and likewise allow for passage of a fastening bolt 43. The grooves and ridges are arranged such that the ridge 49 in the top plate 46 fits into the groove 82 on the valve bucket flange 80, while the ridge 83 on the valve bucket underside fits into the groove 42 of the neck collar. This provides a secure seal.

Figure 4:
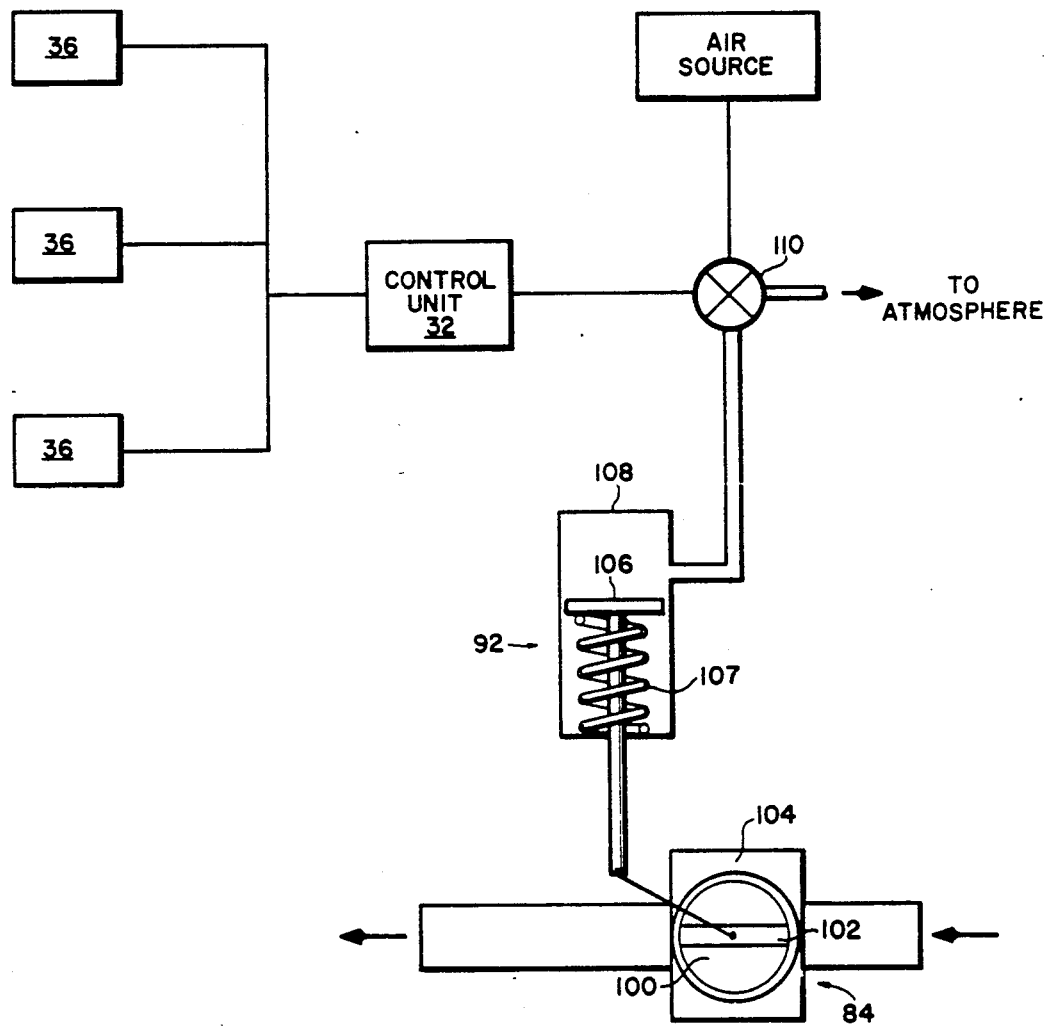
FIG. 4 is a block diagram representing in schematic form the control system components of the bulk storage tank illustrated in FIG. 1.

The valve assembly 76 also includes shut-down valves 84, 86, 88, and 90, one for each of the outlet valves. One of these valves 84 is illustrated schematically in FIG. 4. In the preferred embodiment illustrated, the shut-down valves are standard, commercially available quarter-turn ball valves wherein a generally spherical member 100 with a straight passage 102 through it is rotated within a valve housing 104. When the spherical member is rotated in one position, fluid may flow freely through the straight passage and housing. When the spherical member is rotated by approximately 90 degrees, no fluid will flow through the valve housing, being blocked by the spherical member.

In the illustrated embodiment, one actuator is used to open and close a pair of these shut-down valves. That is, a first actuator 92 operates two shut-down valves 84, 86 and a second actuator 94 operates the other two shut-down valves 88, 90. Each of the actuators comprise a spring-loaded piston 106 moving within a cylinder 108. The piston and its spring 107 are configured to close the associated shut-down valves by the force of the spring. Compressed air may be used to fill the cylinder and push against the piston, compressing the spring and opening the associated shut-down valves. The compressed air for operating the shut-down valve assembly may be provided by an air compressor. Alternatively, many of the plants and facilities using the novel tank will have air-operated valves in the various flow lines 59 The air used to operate these valves may also be used to operate the shut-down valves of the novel tank. A fitting 91 in the top plate 46 provides compressed air from outside the tank to the actuators 92, 94. Thus, under normal tank operation, air pressure is supplied to the actuators to keep their respective shut-down valves open.

When the shut-down valves are open the chlorine supply from the tank may be regulated by the four outlet valves 52–58 by rotating the outlet valve hand wheels 60. Removal of the pressurized air from an actuator allows the spring in the actuator to expand, forcing the shut-down valve closed. That is, the valves operate on an air to open, spring to close principle. Thus, the shut-down valves are employed in a fail-safe manner. The shut-down valves are constructed to completely close, either on command or following the removal of power or control signals, in less than ten seconds.

In normal operation of the tank, the sensors 36 around the tank will detect the absence of the stored fluid and signal the controller 32, which will maintain a supply of pressurized air to the actuators 92, 94 to keep the shut-down valves in the open condition. Upon leakage of a sufficient quantity of fluid from the tank outlet valves to be detected by at least one of the sensors 36, the controller 32 will cause a control valve 110 to shut off the supply of pressurized air to the shut-down valves 84–90, which will close down under the action of their mechanical springs. The air normally routed to the shut-down valves is vented to atmosphere. The closing of all shut-down valves blocks flow to the outlet valves so that the flow of fluid from the tank is shut down, effectively isolating the contents of the tank from any possible leak.

After a tank shut-down has occurred and the shut-down valves are closed, the necessary inspection and repairs may be completed. When resumption of the tank flow is desired, the appropriate start signal may be given to the control unit 32 and pressurized air may be supplied to the shut-down valve assembly 76. The shut-down valves 84, 86, 88, and 90 will then open and flow from the tank will be resumed. Thus, flow from the tank can be conveniently controlled, and started and stopped, without manual intervention.

Conventional tanks ordinarily require a scrubber system with a caustic-containing tank one to several times the size of the associated storage tank. Because a leak can be stopped so completely and quickly with the novel tank described above, the scrubber systems ordinarily provided with bulk storage tanks can be much smaller than now used. It is no longer necessary to provide enough caustic to neutralize the entire contents of the storage tank. For example with a tank constructed in accordance with the present invention, a scrubber system need only contain enough caustic to neutralize approximately one ton of chlorine, even if the tank can store 90 tons.

A preferred embodiment of a bulk storage tank has been disclosed which has the advantages of rapid shut down of flow from the tank outlet valves once a leakage has been detected. The valves are operated in a failsafe manner, such that the loss of power or control supervision results in a shut down of the tank. After the tank has been shut down, a control signal can be used to reactivate the shut down valves, placing them in an open condition. While the illustrated bulk storage tank has been described with respect to air-operated shut-down valves, electrical or hydraulic shut-down valves could also be used. The cable 34 would then supply electrical power or hydraulic fluid to the shut-down valves for operation. Many other additional embodiments will be apparent to those skilled in the art. For example, the invention may be applied to gas bottles for transporting relatively small quantities of gases, such as oxygen tanks. Accordingly, the scope of the present invention is not to be limited merely to the specific embodiment described above, but rather defined by the appended claims and equivalents thereof.

We claim:

1. A pressurized storage apparatus for storing fluid under pressure, the apparatus comprising:
    a pressure vessel tank for storing the fluid under pressure;
    at least one outlet valve communicating with said pressure vessel for releasing the fluid in a controlled flow;
    shut-down means connected to an upstream side of said outlet valve for permitting and blocking the flow of fluid to said outlet valve in response to a control signal;
    sensor means positioned external to said pressure vessel in the vicinity thereof for detecting fluid leaking from said vessel or from said outlet valves for generating signals responsive to the presence or absence of fluid sensed by said sensor means; and
    control means that is responsive to said sensor means and is connected to said shut-down means for signalling said shut-down means to permit flow to said outlet valve when said sensor means senses no fluid leakage and to block flow of fluid to said outlet means when fluid leakage is detected by said sensor means.

2. The storage apparatus as claimed in claim 1, wherein the shut-down means comprises a shut-down valve communicating with the pressure vessel and with the outlet valve.

3. The storage apparatus as claimed in claim 2, wherein the shut-down valve is located within a pressure vessel contained within the tank pressure vessel.

4. The storage apparatus as claimed in claim 1, wherein the shut-down means also blocks the flow of the pressure vessel contents in the absence of a control signal or power from the control means.

5. The storage apparatus as claimed in claim 2, wherein the shut-down valve comprises an air operated valve in which pressurized air works against a mechanical force that would otherwise close the valve.

6. A pressurized storage tank comprising:
    a generally cylindrical pressure vessel for storing contents under pressure;
    a neck extending from and communicating with the pressure vessel;
    at least one outlet valve extending from the neck and communicating with the pressure vessel for releasing the contents of the pressure vessel in a controlled flow;
    a shut-down valve assembly located within the pressure vessel and communicating with the outlet valve for preventing the flow of the tank contents to the outlet valve; and
    control means for generating control signals and supplying actuating power to the shut-down valve assembly.

7. A storage tank as claimed in claim 6, wherein the shut-down valve assembly responds to a predetermined signal from the control means to block and unblock the flow of pressure vessel contents to the outlet valve.

8. A storage tank as claimed in claim 6, wherein the shut-down valve assembly prevents the flow of the tank contents to the outlet valve in the absence of a control signal from the control means.

9. A storage tank as claimed in claim 6, wherein the power to actuate the shut-down valve assembly is provided by pressurized air.

10. A pressurized storage apparatus for keeping gas or liquid contents under pressure and controllably releasing the contents, the apparatus comprising:
    a pressure vessel for keeping the contents under pressure;
    outlet means for controllably releasing the contents from the pressure vessel, the outlet means located external to the pressure vessel; and
    shut-down means located internally in the pressure vessel for blocking and unblocking the release of the contents from the outlet means in response to an external leak detection signal.

* * * * *